United States Patent
Ohshitanai et al.

(10) Patent No.: US 12,363,454 B2
(45) Date of Patent: Jul. 15, 2025

(54) PHOTOELECTRIC CONVERSION DEVICE

(71) Applicant: CANON KABUSHIKI KAISHA, Tokyo (JP)

(72) Inventors: Kazuki Ohshitanai, Kanagawa (JP); Satoshi Kumaki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 18/057,965

(22) Filed: Nov. 22, 2022

(65) Prior Publication Data

US 2023/0179881 A1 Jun. 8, 2023

(30) Foreign Application Priority Data

Dec. 7, 2021 (JP) ................. 2021-198342

(51) Int. Cl.
*H04N 25/60* (2023.01)
*H04N 25/772* (2023.01)

(52) U.S. Cl.
CPC ........... *H04N 25/60* (2023.01); *H04N 25/772* (2023.01)

(58) Field of Classification Search
CPC .............................. H04N 25/60; H04N 25/772
See application file for complete search history.

(56) References Cited

U.S. PATENT DOCUMENTS

| | | | |
|---|---|---|---|
| 9,117,718 B2 | 8/2015 | Ohshitanai | |
| 9,232,164 B2 | 1/2016 | Minowa | |
| 9,426,391 B2 | 8/2016 | Takada | |
| 9,426,398 B2 | 8/2016 | Ohshitanai | |
| 9,554,068 B2 | 1/2017 | Ohshitanai | |
| 9,627,423 B2 | 4/2017 | Takada | |
| 9,769,404 B2 | 9/2017 | Ohshitanai | |
| 10,536,675 B2 | 1/2020 | Kumaki | |
| 2011/0155890 A1 | 6/2011 | Makwana | |
| 2013/0229557 A1 | 9/2013 | Hashimoto | |
| 2015/0036032 A1 | 2/2015 | Itano | |
| 2015/0077608 A1 | 3/2015 | Sakurai | |

(Continued)

FOREIGN PATENT DOCUMENTS

| | | |
|---|---|---|
| JP | 2015-56840 A | 3/2015 |
| JP | 2016-174219 A | 9/2016 |

(Continued)

OTHER PUBLICATIONS

U.S. Appl. No. 18/060,585, filed Dec. 1, 2022, by Kazuki Ohshitanai.

*Primary Examiner* — Lin Ye
*Assistant Examiner* — Fayez A Bhuiyan
(74) *Attorney, Agent, or Firm* — Venable LLP

(57) ABSTRACT

A photoelectric conversion device includes a plurality of pixels arranged to form a plurality of columns, an output line arranged corresponding to each of the plurality of columns, a signal from a corresponding pixel being output to the output line, and a comparison unit arranged corresponding to each of the plurality of columns and having a first input terminal and a second input terminal. A signal corresponding to a potential of the output line is input to the first input terminal. A reference signal is input to the second input terminal. The comparison unit performs an offset clamping operation, and then performs comparison for analog-to-digital conversion of a signal output from a pixel.

15 Claims, 9 Drawing Sheets

(56) References Cited

U.S. PATENT DOCUMENTS

2017/0302869 A1   10/2017   Makoto et al.
2018/0352200 A1   12/2018   Matsumoto
2021/0112211 A1*  4/2021   Kumagai ............... H04N 25/57
2023/0042825 A1    2/2023   Ohshitanai

FOREIGN PATENT DOCUMENTS

JP       2020-80454 A    5/2020
WO    2016/121352 A1   8/2016

* cited by examiner

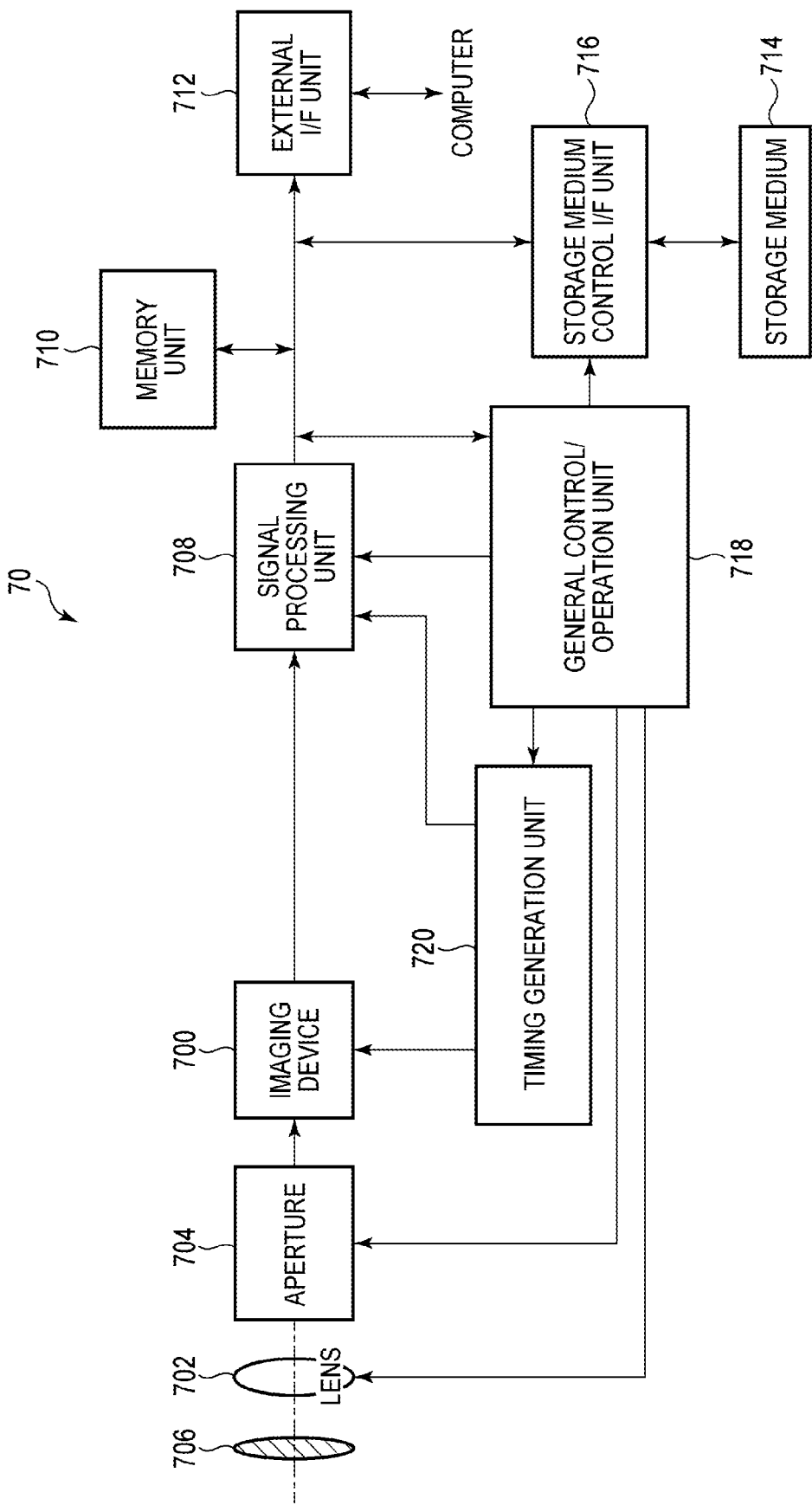

PHOTOELECTRIC CONVERSION DEVICE

BACKGROUND OF THE INVENTION

Field of the Invention

The present disclosure relates to a photoelectric conversion device.

Description of the Related Art

Japanese Patent Application Laid-Open No. 2015-56840 discloses a solid-state imaging device having an analog-to-digital (AD) conversion circuit that converts a pixel signal output from a pixel into a digital signal. The solid-state imaging device disclosed in Japanese Patent Application Laid-Open No. 2015-56840 reduces image quality degradation due to streaking that may occur during operation of the AD converter by short-circuiting vertical signal lines between columns.

However, in the method disclosed in Japanese Patent Application Laid-Open No. 2015-56840, when a defect occurs in an output signal of a certain pixel, an output signal of another pixel in which no defect occurs may be affected by short-circuiting a plurality of vertical signal lines. This may deteriorate the quality of the output signal.

SUMMARY OF THE INVENTION

Accordingly, an object of the present disclosure is to provide a photoelectric conversion device capable of outputting signals of higher quality.

According to an aspect of the present disclosure, there is provided a photoelectric conversion device including a plurality of pixels arranged to form a plurality of columns, an output line arranged corresponding to each of the plurality of columns, a signal from a corresponding pixel being output to the output line, and a comparison unit arranged corresponding to each of the plurality of columns and having a first input terminal and a second input terminal. A signal corresponding to a potential of the output line is input to the first input terminal. A reference signal is input to the second input terminal. The plurality of pixels includes a first pixel and a second pixel. The comparison unit is configured to perform an offset clamping operation of setting an offset based on potentials input to the first input terminal and the second input terminal. The comparison unit performs the offset clamping operation based on a signal output from the first pixel, and then performs comparison for analog-to-digital conversion of a signal output from the second pixel.

According to an aspect of the present disclosure, there is provided a photoelectric conversion device including a plurality of pixels arranged to form a plurality of columns, an output line arranged corresponding to each of the plurality of columns, a signal from a corresponding pixel being output to the output line, a comparison unit arranged corresponding to each of the plurality of columns and having a first input terminal and a second input terminal. A signal corresponding to a potential of the output line is input to the first input terminal. A reference signal is input to the second input terminal. The photoelectric conversion device further includes a second buffer arranged corresponding to each of the plurality of columns and arranged between a signal line to which the reference signal is supplied and the second input terminal. The plurality of columns includes a first column and a second column. The comparison unit is configured to perform an offset clamping operation of setting an offset based on potentials input to the first input terminal and the second input terminal. A comparison unit of the second column performs the offset clamping operation based on a signal output from a second buffer of the first column, and then performs comparison for analog-to-digital conversion of a signal output from a pixel of the second column.

Further features of the present invention will become apparent from the following description of exemplary embodiments with reference to the attached drawings.

BRIEF DESCRIPTION OF THE DRAWINGS

FIG. 9 is a block diagram of equipment according to a sixth embodiment.

DESCRIPTION OF HE EMBODIMENTS

Figure 1:
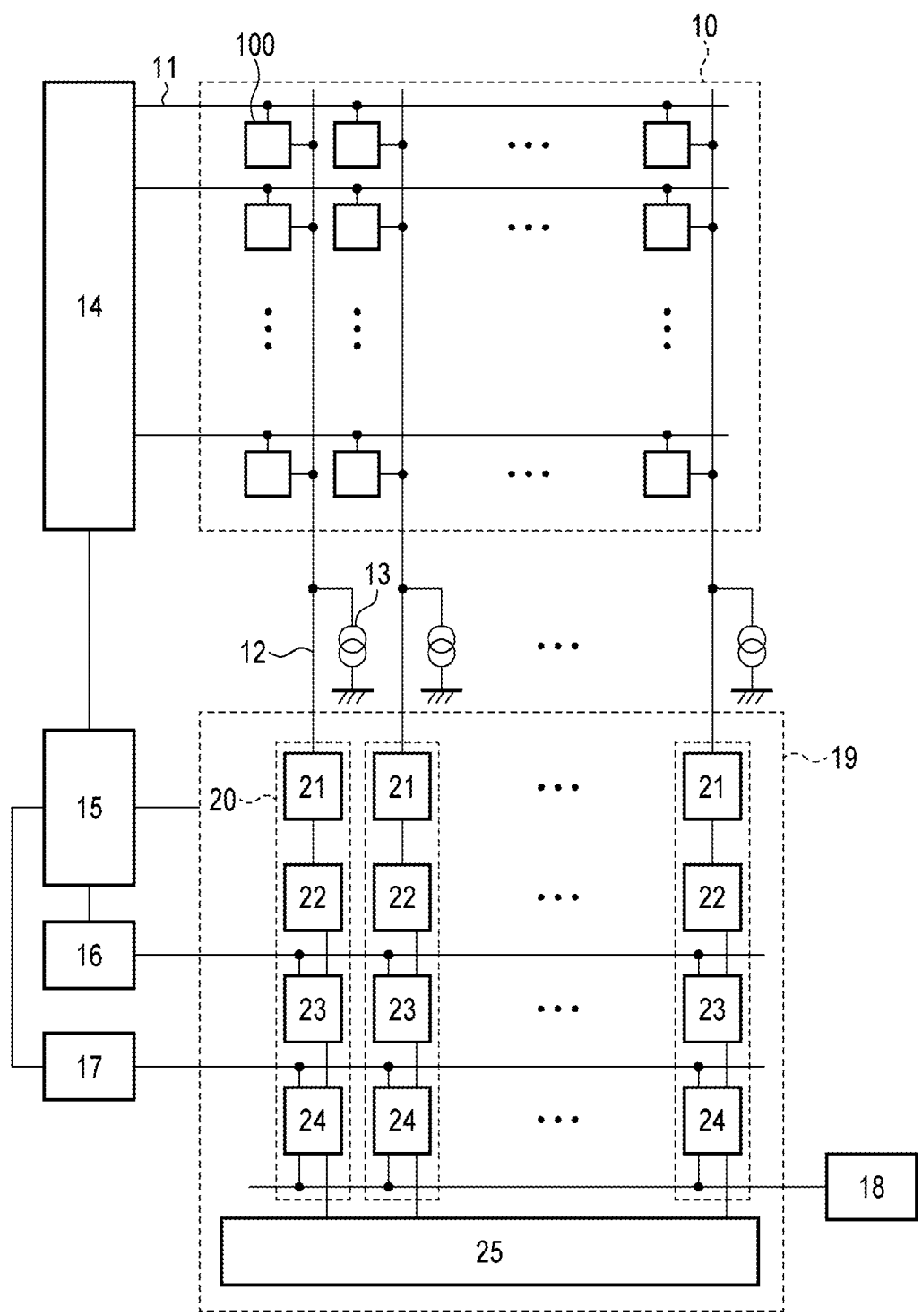
FIG. 1 is a block diagram illustrating a schematic configuration of a photoelectric conversion device according to a first embodiment.

Preferred embodiments of the present invention will now be described in detail in accordance with the accompanying drawings. In the drawings, the same or corresponding elements are denoted by the same reference numerals, and the description thereof may be omitted or simplified.

In the following first to fifth embodiments, an imaging device will be mainly described as an example of a photoelectric conversion device. However, the photoelectric conversion device of each embodiment is not limited to the imaging device, and can be applied to other devices. Examples of other devices include a ranging device and a photometry device. The ranging device may be, for example, a focus detection device, a distance measuring device using a time-of-flight (TOF), or the like. The photometry device may be a device for measuring an amount of light incident on the device.

First Embodiment

FIG. 1 is a block diagram illustrating a schematic configuration of a photoelectric conversion device according to the first embodiment. The photoelectric conversion device includes a pixel array 10, current sources 13, a vertical scanning circuit 14, a timing generator 15, a reference signal generation circuit 16, a counter 17, a digital signal processing circuit 18, and a reading circuit 19.

The pixel array 10 includes a plurality of pixels 100 arranged in a matrix forming a plurality of rows and a plurality of columns. Each of the plurality of pixels 100 includes a photoelectric conversion unit including a photoelectric conversion element such as a photodiode. The pixel 100 outputs a photoelectric conversion signal that is an analog signal corresponding to an amount of incident light on the photoelectric conversion element. The pixel 100 outputs a noise signal that is an analog signal of a noise level. The pixel array 10 may include optical black pixels (not illustrated) in which photoelectric conversion elements are shielded from light, and an output signal of the optical black pixel is used as a reference for black level.

In each row of the pixel array 10, a plurality of control lines 11 are arranged so as to extend in a first direction (horizontal direction in FIG. 1). Each of the plurality of control lines 11 is connected to each of the pixels 100 arranged in the first direction, and serves as a signal line common to the pixels 100. The first direction in which the control lines 11 extend may be referred to as a row direction or a horizontal direction. The control line 11 is connected to the vertical scanning circuit 14.

In each column of the pixel array 10, output lines 12 are arranged so as to extend in a second direction (vertical direction in FIG. 1) intersecting with the first direction. Each of the output lines 12 is connected to each of the pixels 100 arranged in the second direction, and serves as a signal line common to the pixels 100. The second direction in which the output lines 12 extend may be referred to as a column direction or a vertical direction. Each of the output lines 12 is connected to the reading circuit 19 and a current source 13 arranged in corresponding column.

The vertical scanning circuit 14 is a control circuit having functions of receiving control signals output from the timing generator 15, generating control signals for driving the pixels 100, and supplying the control signals to the pixels 100 via the control lines 11. A logic circuit such as a shift register or an address decoder may be used for the vertical scanning circuit 14. The vertical scanning circuit 14 drives the pixels 100 of the pixel array 10 in a row basis. The signals read out from the pixels 100 in a row basis are input to the reading circuit 19 via the output lines 12 provided in respective columns of the pixel array 10.

In FIG. 1, only three rows and three columns are illustrated for the pixels 100, the control lines 11, and the output lines 12, but actually, the pixels 100, the control lines 11, and the output lines 12 may be arranged over several thousands of rows and several thousands of columns.

The reading circuit 19 includes column circuits 20 that are provided corresponding to the output lines 12 of respective columns, and a horizontal scanning circuit 25. The column circuit 20 has a function of reading out a noise signal and a photoelectric conversion signal output from the pixel 100 and converting them into digital signals, and a function of holding the digital signals after the AD conversion. The column circuit 20 includes an amplification unit 21, an analog signal holding unit 22, an AD conversion unit 23, and a digital signal holding unit 24.

The amplification unit 21 amplifies the noise signal and the photoelectric conversion signal output from the pixel 100 and outputs an analog signal. The analog signal holding unit 22 temporarily holds the analog signal output from the amplification unit 21. The analog signal holding unit 22 outputs the held signal.

The reference signal generation circuit 16 is a circuit that receives a control signal output from the timing generator 15 and generates a reference signal to be supplied to the AD conversion unit 23. The reference signal is a signal having a predetermined amplitude, and may include, for example, a signal whose signal level (signal magnitude) changes over time. The reference signal typically includes a ramp signal. The ramp signal is a signal whose signal level monotonically changes with time, for example, a signal whose output voltage monotonically decreases or monotonically increases with time. The reference signal is not particularly limited as long as it has an amplitude applicable to AD conversion.

The AD conversion unit (analog-to-digital conversion unit) 23 compares the signal output from the analog signal holding unit 22 with the reference signal output from the reference signal generation circuit 16, and outputs a latch signal based on the comparison result to the digital signal holding unit 24.

The counter 17 generates a count signal whose value changes with time by counting pulses of a clock signal, and outputs the count signal to the digital signal holding unit 24.

The digital signal holding unit 24 holds the count signal output from the counter 17 as a digital signal at a timing when the latch signal output from the AD conversion unit 23 changes. The digital signal holding unit 24 can hold digital values of the noise signal and the photoelectric conversion signal.

The horizontal scanning circuit 25 sequentially supplies control signals to the digital signal holding units 24 of the respective columns. As a result, the digital signals held in the digital signal holding units 24 of respective columns are sequentially transferred to the digital signal processing circuit 18. The horizontal scanning circuit 25 may be configured using a shift register, an address decoder, or the like.

The digital signal processing circuit 18 processes the digital signals output from the digital signal holding units 24 of respective columns, and outputs the processed signals to the outside of the photoelectric conversion device. Examples of the signal processing performed by the digital signal processing circuit 18 include correction processing using digital correlated double sampling, amplification processing, or the like.

The timing generator 15 is a control circuit fir supplying control signals for controlling operations and timings of the vertical scanning circuit 14, the reading circuit 19, the reference signal generation circuit 16, and the counter 17. At least a part of the control signals supplied to the vertical scanning circuit 14, the reading circuit 19, the reference signal generation circuit 16, and the counter 17 may be supplied from the outside of the photoelectric conversion device.

Figure 2:
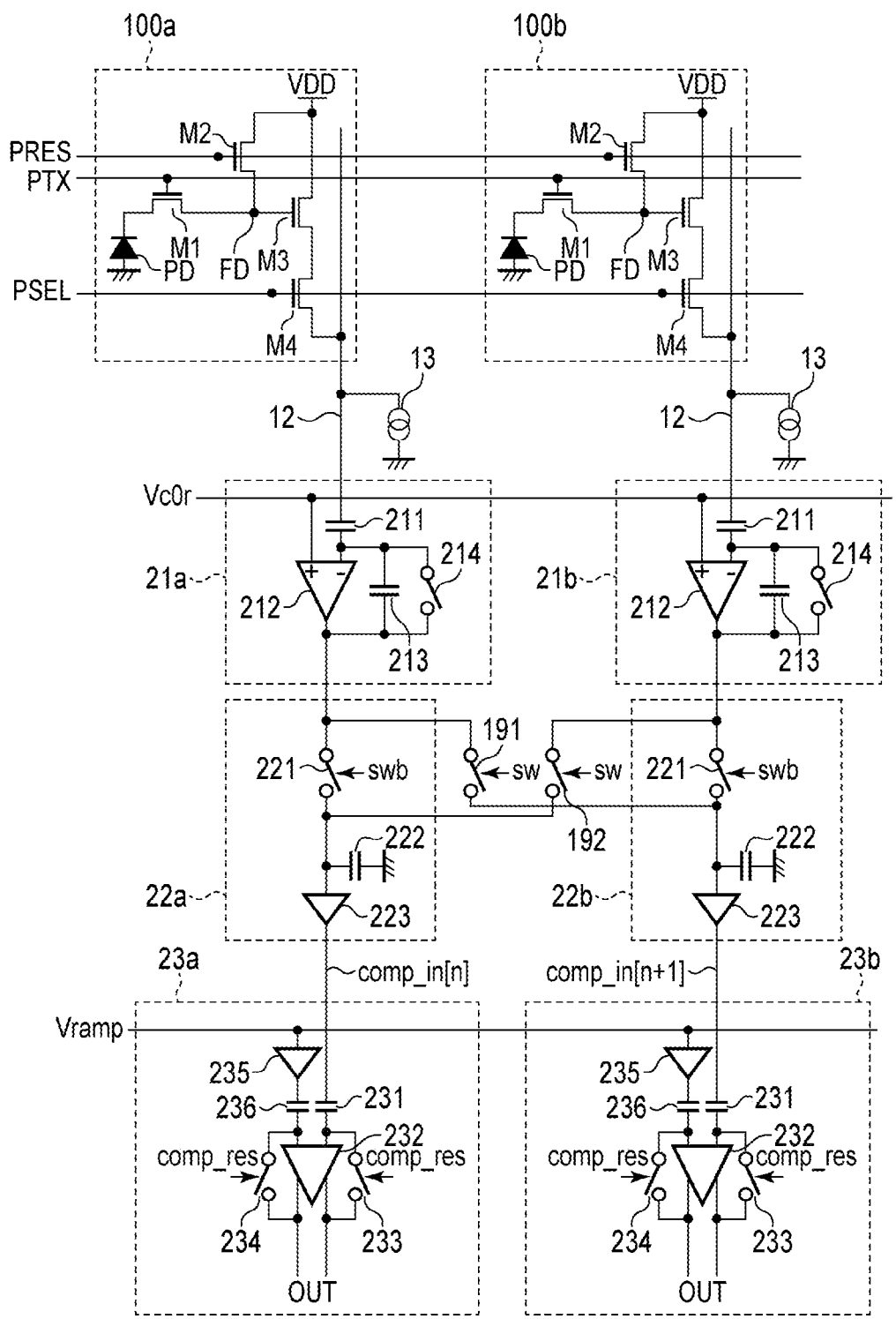
FIG. 2 is a circuit diagram illustrating a configuration of a pixel and a column circuit according to the first embodiment.

FIG. 2 is a circuit diagram illustrating a configuration of the pixel 100 and the column circuit 20 according to the present embodiment. FIG. 2 illustrates the circuit configuration of two pixels 100 and a part of the circuit configuration of the column circuits 20 for two columns in the photoelectric conversion device of FIG. 1 in more detail. The two columns illustrated in FIG. 2 are the n-th column and the (n+1)-th column ("n" is a natural number). The n-th column and the (n+1)-th column are sometimes simply referred to as a first column and a second column. When it is necessary to distinguish between elements in two columns, an index "a" indicating that the element is an element in the n-th column or an index "b" indicating that the element is an element in the (n+1)-th column may be added to the reference numerals of some elements in FIG. 2. Since the elements in the n-th column and the elements in the (n+1)-th column have substantially the same configuration, the description of the elements in the (n+1)-th column may be omitted.

FIG. 2 illustrates pixels 100a and 100b, current sources 13, amplification units 21a and 21b, analog signal holding units 22a and 22b, AD conversion units 23a and 23b, and switches 191 and 192. Other elements in FIG. 1 are not illustrated in FIG. 2.

The pixel 100a includes a photoelectric conversion element PD, a transfer transistor M1, a reset transistor M2, an amplification transistor M3, and a selection transistor M4.

The photoelectric conversion element PD is, for example, a photodiode. The anode of the photoelectric conversion element PD is connected to a ground node, and the cathode of the photoelectric conversion element PD is connected to the source of the transfer transistor M1. The drain of the transfer transistor M1 is connected to the source of the reset transistor M2 and the gate of the amplification transistor M3. A node FD to which the drain of the transfer transistor M1, the source of the reset transistor M2, and the gate of the amplification transistor M3 are connected is a so-called floating diffusion portion. The floating diffusion portion has a capacitance component (floating diffusion capacitance) and functions as a charge holding portion. The floating diffusion capacitance includes a PN junction capacitance, a wiring capacitance, and the like.

The drain of the reset transistor M2 and the drain of the amplification transistor M3 are connected to a power supply voltage node to which a voltage VDD is supplied. The source of the amplification transistor M3 is connected to the drain of the selection transistor M4. The source of the selection transistor M4 is connected to the output line 12.

In the case of the pixel configuration of FIG. 2, the control lines 11 of each row includes a signal line connected to the gate of the transfer transistor M1, a signal line connected to the gate of the reset transistor M2, and a signal line connected to the gate of the selection transistor M4. A control signal PTX is supplied from the vertical scanning circuit 14 to the gate of the transfer transistor M1. A control signal PRES is supplied from the vertical scanning circuit 14 to the gate of the reset transistor M2. A control signal PSEL is supplied from the vertical scanning circuit 14 to the gate of the selection transistor M4. A plurality of pixels 100a and 100b in the same row are connected to a common signal line, and are controlled at the same time by a common control signal.

In the present embodiment, it is assumed that electrons are used as signal charges among electron-hole pairs generated in the photoelectric conversion element PD by light incidence. When electrons are used as the signal charges, each transistor included in the pixel 100a may be composed of an N-type MOS transistor. When each transistor is composed of the N-type MOS transistor, when a high-level control signal is supplied from the vertical scanning circuit 14, the corresponding transistor is turned on. When a low-level control signal is supplied from the vertical scanning circuit 14, the corresponding transistor is turned off. However, the signal charges are not limited to electrons, and holes may be used as the signal charges. When holes are used as signal charges, the conductivity type of each transistor is opposite to that described in the present embodiment. The term "source" or "drain" of the MOS transistor may vary depending on the conductivity type of the transistor or the target function. Some or all of "source" and "drain" used in the present embodiment are sometimes referred to in opposite terms.

The photoelectric conversion element PD converts (photoelectrically converts) incident light into charges of an amount corresponding to the amount of the incident light. The transfer transistor M1 is turned on to transfer charges held in the photoelectric conversion element PD to the node PD. The charges transferred from the photoelectric conversion element PD is held in the capacitance (floating diffusion capacitance) of the node FD. As a result, the node FD has a potential corresponding to the amount of charges transferred from the photoelectric conversion element PD by the charge-voltage conversion by the floating diffusion capacitance.

The selection transistor M4 is turned on to connect the amplification transistor M3 to the output line 12. The amplification transistor M3 is configured such that a voltage VDD is supplied to the drain and a bias current is supplied from the current source 13 to the source via the selection transistor M4, and constitutes an amplifier circuit source follower circuit) having a gate as an input node. Accordingly, the amplification transistor M3 outputs a signal based on the voltage of the node FD to the output line 12 through the selection transistor M4. In this sense, the amplification transistor M3 and the selection transistor M4 are an output unit that outputs pixel signals corresponding to the amount of charges held in the node FD.

The reset transistor M2 has a function of controlling supply of a voltage (voltage VDD) to the node FD, the voltage resetting the node FD that functions as a charge holding portion. The reset transistor M2 is turned on to reset the node FD to a voltage corresponding to the voltage VDD.

The amplification unit 21a includes an input capacitor 211, a differential amplifier 212, a feedback capacitor 213, and a switch 214. A first terminal of the input capacitor 211 is an input node of the amplification unit 21a. The first terminal of the input capacitor 211 is connected to the output line 12. A second terminal of the input capacitor 211 is connected to an inverting input terminal of the differential amplifier 212, a first terminal of the feedback capacitor 213, and a first terminal of the switch 214. A power supply line having a reference voltage Vc0r is connected to a non-inverting input terminal of the differential amplifier 212. An output terminal of the differential amplifier 212 is an output node of the amplification unit 21a. The output terminal of the differential amplifier 212 is connected to a second terminal of the feedback capacitor 213 and a second terminal of the switch 214.

With the circuit configuration described above, the amplification unit 21a functions as an inverting amplifier circuit that amplifies the voltage of the analog signal output to the output line 12. The switch 214 is controlled by a control signal from the timing generator 15 to be turned on or off. When the switch 214 transitions from the on state to the off state, the potential input to the input capacitor 211 at that time is clamped. The amplification factor of the amplification unit 21a when the switch 214 is off is determined by a ratio of the capacitance value of the input capacitor 211 to the capacitance value of the feedback capacitor 213.

The analog signal holding unit 22a includes a switch 221, a holding capacitor 222, and an amplifier 223. The output node of the amplification unit 21a is connected to a first terminal of the switch 221. The first terminal of the switch 221 is an input node of the analog signal holding unit 22a. A second terminal of the switch 221 is connected to the holding capacitor 222 and an input terminal of the amplifier 223. The output terminal of the amplifier 223 is an output node of the analog signal holding unit 22a.

The analog signal output from the amplification unit 21a is held in the holding capacitor 222. The amplifier 223 (first buffer) is a buffer circuit such as a source follower, and outputs an analog signal corresponding to the potential held in the holding capacitor 222. Thus, the analog signal holding unit 22a forms a sample and hold circuit for holding the analog signal output from the amplification unit 21a.

Four switches including the switches 191 and 192, the switch 221 in the n-th column, and the switch 221 in the (n+1)-th column form a signal switching circuit. A first terminal of the switch 191 is connected to a node of the first terminal of the switch 221 in the n-th column. A second terminal of the switch 191 is connected to a node to which the second terminal of the switch 221 in the (n+1)-th column and the holding capacitor 222 in the (n+1)-th column are connected. A first terminal of the switch 192 is connected to a node of the first terminal of the switch 221 in the (n+1)-th column. A second terminal of the switch 192 is connected to a node to which the second terminal of the switch 221 in the n-th column and the holding capacitor 222 in the n-th column are connected.

The switches 191 and 192 are controlled by a control signal sw from the timing generator 15 to be turned on or off. The switch 221 is controlled by a control signal swb from the timing generator 15 to be turned on or off. The control signal swb is a signal having a potential at the opposite level of the control signal sw. When the control signal sw is at the low level and the control signal swb is at the high level, the switch 221 is turned on, and the switches 191 and 192 are turned off. At this time, the signal output from the amplification unit 21a of the n-th column is held in the holding capacitor 222 of the n-th column, and the signal output from the amplification unit 21b of the (n+1)-th column is held in the holding capacitor 222 of the (n+1)-th column.

On the other hand, when the control signal sw is at the high level and the control signal swb is at the low level, the switches 191 and 192 are turned on and the switch 221 is turned off. At this time, the signal output from the amplification unit 21a of the n-th column is held in the holding capacitor 222 of the (n+1)-th column, and the signal output from the amplification unit 21b of the (n+1)-th column is held in the holding capacitor 222 of the n-th column. As described above, the signal switching circuit including the switches 191 and 192, the switch 221 in the n-th column, and the switch 221 in the (n+1)-th column has a function of swapping the signal in the n-th column and the signal in the (n+1)-th column with each other in accordance with the control signals sw and swb.

Note that a potential of the analog signal output from the analog signal holding unit 22a in the n-th column is referred to as comp_in[n], and the potential of the analog signal output from the analog signal holding unit 22b in the (n+1)-th column is referred to as comp_in[n+1].

The AD conversion unit 23a includes input capacitors 231 and 236, a comparator 232, switches 233 and 234, and an amplifier 235. The comparator 232 is a fully-differential type comparator having a first input terminal, a second input terminal, a first output terminal, and a second output terminal, and functions as a comparison unit for AD conversion. The comparator 232 compares the potentials of the first input terminal and the second input terminal, and outputs signals based on the comparison result as output signals OUT from the first output terminal and the second output terminal. The output signals are input to a latch circuit (not illustrated). The latch circuit outputs a latch signal to the digital signal holding unit 24.

The output node of the analog signal holding unit 22a is connected to a first terminal of the input capacitor 231 (first input capacitor). The first terminal of the input capacitor 231 is an input node of the AD conversion unit 23a. A second terminal of the input capacitor 231 is connected to the first input terminal of the comparator 232 and a first terminal of the switch 233. A second terminal of the switch 233 is connected to the first output terminal of the comparator 232.

A reference signal Vramp is input from the reference signal generation circuit 16 to an input terminal of the amplifier 235. The amplifier 235 (second butler) is a buffer circuit such as a source follower. An output terminal of the amplifier 235 is connected to a first terminal of the input capacitor 236 (second input capacitor). A second terminal of the input capacitor 236 is connected to the second input terminal of the comparator 232 and a first terminal of the switch 234. A second terminal of the switch 234 is connected to the second output terminal of the comparator 232. The switches 233 and 234 are controlled by a control signal comp_res from the timing generator 15 to be turned on or off. When the control signal comp_res is at the high level, the switches 233 and 234 are turned on, and when the control signal comp_res is at the low level, the switches 233 and 234 are turned off.

Figure 3:
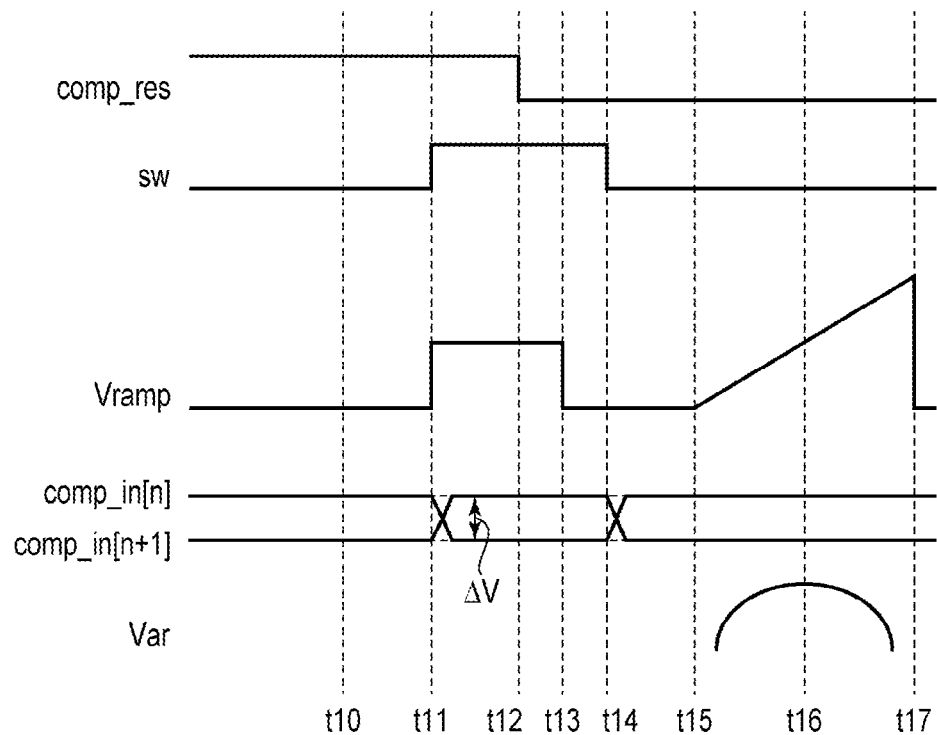
FIG. 3 is a timing chart illustrating a driving method of the photoelectric conversion device according to the first embodiment.

FIG. 3 is a timing chart illustrating a driving method of the photoelectric conversion device according to the present embodiment. FIG. 3 illustrates levels of the control signals comp_res and sw; a potential of the reference signal Vramp, and potentials of the input signals comp_in[n] and comp_in [n+1]. Note that a level of the control signal swb is a level opposite to the level of the control signal sw and is not illustrated because it is apparent. Further, "Var" in FIG. 3 schematically indicates a variation of the timings at which the levels of the output signals of the comparators 232 of respective columns change. A period from time t10 to time t17 in FIG. 3 is a period during which the AD conversion of the noise signal is performed by comparing the noise signal from the pixel 100 with the reference signal Vramp in the AD conversion unit 23. The driving timings of the AD conversion of the noise signal will be described with reference to FIG. 3.

At time t10, the control signal comp_res is at the high level, and the switches 233 and 234 are on. Thus, the potentials of the first input terminal, the second input terminal, the first output terminal, and the second output terminal of the comparator 232 are reset. Since the control signal sw is at the low level and the control signal swb is at the high level, the switches 191 and 192 are off and the switch 221 is on.

The input signals comp_in[n] and comp_in[n+1] are signals in which noise generated in the amplification unit 21 and the analog signal holding unit 22 is superimposed on the noise signal output from the pixel 100. The noise signal clamped by the amplification unit 21 includes a charge reinjection component when the switch 214 transitions from the on state to the off state. The charge reinjection is a phenomenon in which, when the switch 214 transitions from the on state to the off state, the charges located under the gate of a transistor constituting the switch 214 moves to each of the inverting input terminal and the output terminal of the differential amplifier 212. The charge reinjection component included in the noise signal is different for each amplification unit 21 of each column. Therefore, at the time t10, the input signal comp_in[n] and the input signal comp_in[n+1] have potentials different from each other.

At time t11, the control signal sw becomes the high level and the control signal swb becomes the low level. As a result, the switches 191 and 192 are turned on, and the switch 221 is turned off. By this operation, the analog signal held in the holding capacitor 222 in the n-th column and the analog signal held in the holding capacitor 222 in the (n+1)-th column are swapped. Therefore, the signal of the n-th column is input as the input signal comp_in[n+1] to the AD conversion unit 23b via the amplifier 223 of the (n+1)-th column, and the signal of the (n+1)-th column is input as the input signal comp_in[n] the AD conversion unit 23a via the amplifier 223 of the n-th column. Thus, after time t11, the potentials of the input signal comp_in[n] and the input signal comp_in[n+1] are swapped. Hereinafter, this state may be referred to as a first state. At the time t11, the reference signal Vramp is set to an offset level.

At time t12, the control signal comp_res becomes the low level. As a result, the switches 233 and 234 are turned off. The potential of the second input terminal of the comparator 232 at the time t12 is a reset potential based on the reference signal Vramp which is the offset level. The charges based on the potential of the offset level of the reference signal Vramp at the time t12 is clamped to the input capacitor 236. Hereinafter, this operation may be referred to as an offset clamping operation.

The charges based on the output potential of the comparator 232 at the time t12 is clamped to the input capacitor 231. The potential of the input signal comp_in[n] is different from the potential of the input signal comp_in[n+1] by ΔV. Therefore, potentials different by ΔV are clamped to the input capacitors 231 of the n-th column and the (n+1)-th column. Since both potentials are swapped at the time t11, the potentials clamped to the input capacitors 231 of the n-th column and the (n+1)-th column by the offset clamping operation are different by ΔV from the potentials of the input signals before the time t11. The noise signal held in the input capacitor 231 includes a noise component of the AD conversion unit 23. The noise component includes a charge reinjection component when the switch 233 transitions from the on state to the off state. The signal held in the input capacitor 236 includes a charge reinjection component when the switch 234 transitions from the on state to the off state.

At time t13, the setting of the reference signal Vramp to the offset level is canceled. Thereby, the potential of the reference signal Vramp returns to the potential at the time t10.

At time t14, the control signal sw becomes the low level and the control signal swb becomes the high level. As a result, the switches 191 and 192 are turned off, and the switch 221 is turned on. Therefore, the signal of the n-th column is input as the input signal comp_in[n] to the AD conversion unit 23a via the amplifier 223 of the n-th column, and the signal of the (n+1)-th column is input as the input signal comp_in[n+1] to the AD conversion unit 23b via the amplifier 223 of the (n+1)-th column. Thus, after the time t14, the swapping of the potentials of the input signal comp_in[n] and the input signal comp_in[n+1] is canceled. Hereinafter, this state may be referred to as a second state.

At time t15, the reference signal generation circuit 16 changes the potential of the reference signal Vramp depending on time. At the time t15, the counter 17 starts a counting operation of a clock signal.

Time t16 is a time when the potential of the reference signal Vramp exceeds the offset level. Near the time #16, the magnitude relationship between the input signals comp_in [n] and comp_in[n+1] and the reference signal Vramp is reversed, and the level of the output signal of the comparator 232 changes. Thereby, the latch signal is output from the latch circuit to the digital signal holding unit 24. In response to the change of the latch signal, the digital signal holding unit 24 holds the count signal at this time. The count signal held in the digital signal holding unit 24 is a digital signal corresponding to the noise signal.

At time t17, the reference signal generation circuit 16 stops the change of the potential of the reference signal Vramp. Then, the potential of the reference signal Vramp returns to the potential at the time t10. At the time t17, the counter 17 stops the counting operation of the clock signal and resets the count value.

After the time t17, the analog-to-digital conversion of the photoelectric conversion signal is performed in the same manner as the noise signal, and the digital signal corresponding to the photoelectric conversion signal is held in the digital signal holding unit 24. Then, the horizontal scanning circuit 25 sequentially scans the digital signal holding units 24 of the respective columns, and the digital signals held in the digital signal holding units 24 of the respective columns are output to the digital signal processing circuit 18.

As described above, the digital signal based on the noise signal and the digital signal based on the photoelectric conversion signal are output from the column circuit 20 of each column to the digital signal processing circuit 18. The digital signal based on the photoelectric conversion signal includes a component of the noise signal. Accordingly, the digital signal processing circuit 18 can generate a signal with less noise signal by subtracting the digital signal based on the noise signal from the digital signal based on the photoelectric conversion signal.

Figure 4:
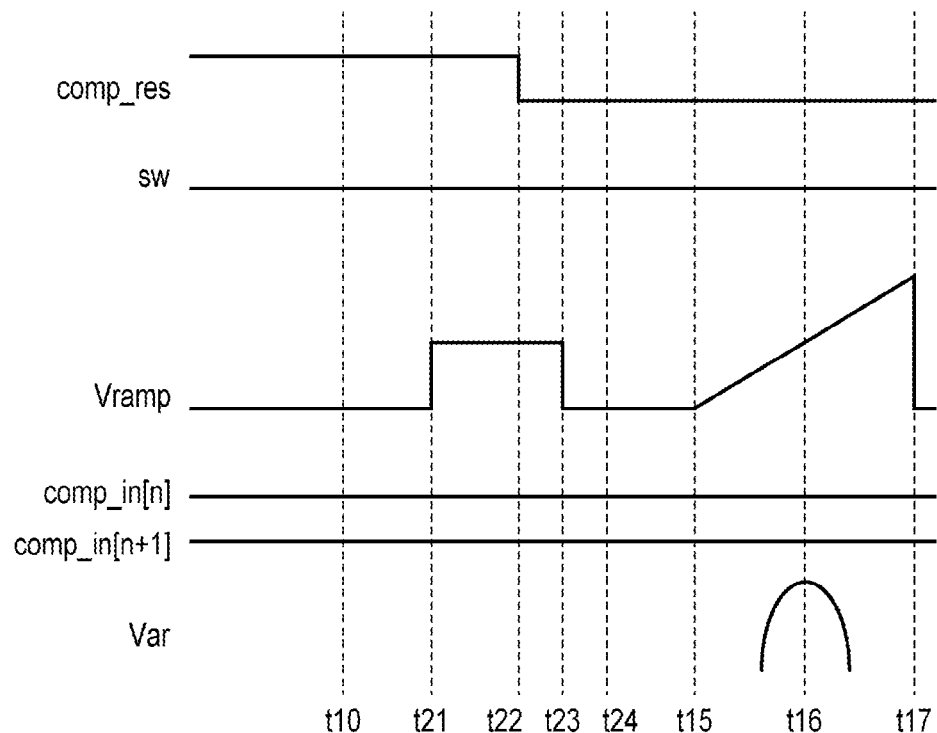
FIG. 4 is a timing chart illustrating a driving method of the photoelectric conversion device according to the first embodiment.

FIG. 4 is a timing chart illustrating a driving method when the switches 191 and 192 are not turned on and the switch 221 is kept on in the photoelectric conversion device of the present embodiment. The effect of the present embodiment will be described with reference to FIGS. 3 and 4.

In the driving method of FIG. 3, since the control signal sw is at the high level and the control signal swb is at the low level in a period from the time t11 to the time t14, the switches 191 and 192 are on and the switch 221 is off in the period. On the other hand, in the driving method of FIG. 4, the control signal sw is maintained at the low level and the control signal swb is maintained at the high level in a period from time t21 to time t24 corresponding to the period from the time t11 to the time t14. Thus, the switches 191 and 192 are not turned on and the switch 221 is kept on, which is a difference from FIG. 3 in FIG. 4. That is, it can be paraphrased that FIG. 4 illustrates a case where the signal switching circuit in the present embodiment is not provided.

As illustrated in FIG. 4, at time t22, the input signal comp_in[n] and the input signal comp_in[n+1] have potentials different from each other. Therefore, different potentials are clamped between the input capacitor 231 in the n-th column and the input capacitor 231 in the (n+1)-th column. In the example of FIG. 4, the input signal comp_in[n] at the time t22 and the input signal comp_in[n] at the time t16 are substantially the same. In this case, at the time t16 when the potential of the reference signal Vramp exceeds the offset level, the level of the output signal of the comparator 232 of the n-th column changes. The input signal comp_in[n+1] at the time t22 and the input signal comp_in[n+1] at the time t16 are also substantially the same. In this case, at the time t16 when the potential of the reference signal Vramp exceeds the offset level, the level of the output signal of the comparator 232 of the (n+1)-th column also changes. Therefore, as illustrated in FIG. 4, when the operation of turning on the switch 191 is not performed in the offset clamping operation, the level of the output signal of the comparator 232 of the n-th column and the level of the output signal of the comparator 232 of the (n+1)-th column change almost simultaneously. Therefore, as indicated by "Var" in FIG. 4, the variation of the timings at which the levels of the output signals of the comparators 232 of respective column change is small.

When the variation of the timings at which the levels of the output signals of the comparators 232 of respective columns change is small, the levels of the output signals of the plurality of comparators 232 may change simultaneously within a short time. This may cause noise due to factors such as IR drop and current variation. In particular, when the number of columns of the pixels 100 is large, since a large number of comparators 232 are arranged in the photoelectric conversion device, the influence of this noise is significant. Since this noise can be propagated to the other comparators 232 by the power supply wiring or the signal wiring commonly arranged in the columns, the noise may be a factor that deteriorates the quality of the output signal. Also, in a circuit at a stage subsequent to the comparator 232, this noise may cause an AD conversion error, a decrease in accuracy of the counting operation of the clock signal in the counter 17, or the like, thereby deteriorating the quality of the output signal.

On the other hand, in the driving method illustrated in FIG. 3, since the switches 191 and 192 are on and the switch 221 is off during the offset clamping operation at the time t12, potentials which are swapped with each other are clamped between the n-th column and the (n+1)-th column. Thereby, in each of the n-th column and the (n+1)-th column, the input potential of the comparator 232 at the time of the offset clamping operation of the time t12 and the input potential of the comparator 232 at the time of the AD conversion of the time t16 become different potentials from each other. That is, the potential at the time of the AD conversion of the input signal comp_in[n] is greater than that at the time of the offset clamping operation by $\Delta V$. The potential at the time of the AD conversion of the input signal comp_in[n+1] is less than that at the time of the offset clamping operation by $\Delta V$.

In the driving method illustrated in FIG. 3, as indicated by "Var" in FIG. 3, the variation of the timings at which the levels of the output signals of the comparators 232 of respective columns change is large. Therefore, the levels of the output signals of the plurality of comparators 232 hardly change all at once within a short time, and noise generated when the levels of the output signals of the comparators 232 of respective columns change can be reduced.

In a method of short-circuiting a plurality of vertical signal lines as disclosed in Japanese Patent Application Laid-Open No. 2015-56840, when a defect occurs in an output signal of a certain pixel, an output signal of a pixel where no defect occurs and an output signal of a pixel where a defect occurs may be averaged. This may deteriorate the quality of the output signal of the pixel where no defect occurs. On the other hand, in the present embodiment, since a configuration in which signals of a plurality of columns can e swapped is provided, signal lines are not short-circuited, so that deterioration in quality of an output signal due to the above factors can be reduced.

As described above, according to the present embodiment, a photoelectric conversion device capable of outputting signals of higher quality is provided.

In the present embodiment, the operation of swapping the output signals between different columns is performed at the time of the offset clamping operation. That is, the pixels (first pixels) that output the signals to be clamped in the offset clamping operation and the pixels (second pixels) that output the signals to be subjected to the AD conversion are arranged in the same row and in different columns. However, the pixels that output the signals to be clamped in the offset clamping operation and the pixels that output the signals to be subjected to the AD conversion may be arranged in the same column and different rows.

In the present embodiment, the switches 191 and 192 are controlled to be on and the switch 221 is controlled to be off at the time of the offset clamping operation of the time 112. However, if the potential of the input signal comp_in[n] at the time of the offset clamping operation and the potential of the input signal comp_in[n] at the time of the AD conversion operation are different from each other, the switches 191 and 192 may be turned off and the switch 221 may be turned on at a time before the time t12.

Further, the photoelectric conversion device of the present embodiment may have a configuration capable of changing the gain by changing the setting of the amplification unit 21 or the amount of change of the potential of the reference signal Vramp per unit time (slope). In this case, the operation of the switches 191, 192, and 221 at the time of the offset clamping operation may be made different depending on the gain. The variation of the timings at which the levels of the output signals of the comparators 232 change may vary depending on the gain. Further, a degree of noise caused by the change in the level of the output signal may vary depending on the gain of the photoelectric conversion device. Thus, since the optimal control method may vary depending on the gain, it may be desirable to change the operation of the switches 191, 192, and 221.

The variation of the timing at which the levels of the output signals of the comparators 232 change may also vary depending on the temperature of the photoelectric conversion device. Therefore, the temperature of the photoelectric conversion device may be measured by a temperature sensor, and the operation of the switches 191, 192, and 221 at the time of the offset clamping operation may be varied depending on the temperature.

Second Embodiment

The photoelectric conversion device according to the present embodiment will be described. Components similar to those in the first embodiment are denoted by the same reference numerals, and descriptions of these components may be omitted or simplified.

Figure 5:
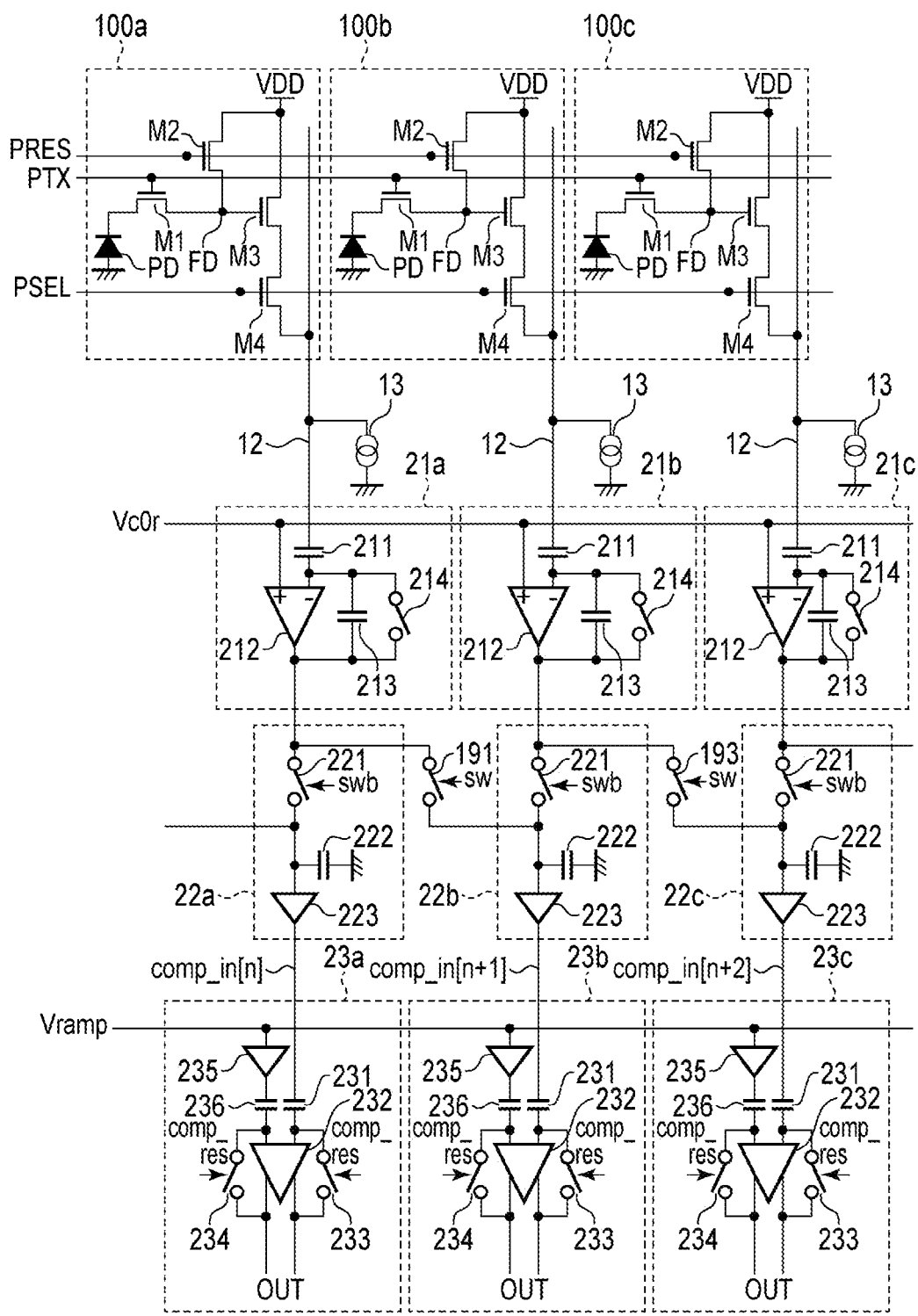
FIG. 5 is a circuit diagram illustrating a configuration of a pixel and a column circuit according to a second embodiment.

FIG. 5 is a circuit diagram illustrating a configuration of the pixel 100 and the column circuit 20 according to the present embodiment. In the photoelectric conversion device of the present embodiment, a switch 193 is provided instead of the switch 192 in FIG. 2. Further, in FIG. 5, in addition to the circuits of the n-th column and the (n+1)-th column in FIG. 2, the circuits of the (n+2)-th column are further illustrated. Note that the (n+2)-th column may be simply referred to as a third column. In addition, an index "c" indicating that the element is an element in the (n+2)-th column may be added to the reference numerals of some elements in FIG. 5.

Five switches including the switches 191 and 193, the switch 221 in the n-th column, the switch 221 in the (n+1)-th column, and the switch 221 in the (n+2)-th column form a signal switching circuit. The first terminal of the switch 191 is connected to the node of the first terminal of the switch 221 in the n-th column. The second terminal of the switch 191 is connected to a node to which the second terminal of the switch 221 in the (n+1)-th column and the holding capacitor 222 in the (n+1)-th column are connected. A first terminal of the switch 193 is connected to the node of the first terminal of the switch 221 in the (n+1)-th column. A second terminal of the switch 193 is connected to anode to which the second terminal of the switch 221 in the (n+2)-th column and the holding capacitor 222 in the (n+2)-th column are connected.

The switches 191 and 193 are controlled by the control signal sw from the timing generator 15 to be turned on or off. The switch 221 is controlled by the control signal swb from the timing generator 15 to be turned on or off. The control signal swb is a signal having a potential at the opposite level of the control signal sw. When the control signal sw is at the low level and the control signal swb is at the high level, the switch 221 is turned on, and the switches 191 and 193 are turned off. At this time, the signals output from the amplification unit 21a in the n-th column, the amplification unit 21b in the (n+1)-th column, and the amplification unit 21c in the (n+2)-th column are held in the holding capacitors 222 in the n-th column, the (n+1)-th column, and the (n+2)-th column, respectively.

On the other hand, when the control signal sw is at the high level and the control signal swb is at the low level, the switches 191 and 193 are turned on and the switch 221 is turned off. At this time, the signal output from the amplification unit 21a of the n-th column is held in the holding capacitor 222 of the (n+1)-th column, and the signal output from the amplification unit 21b of the (n+1)-th column is held in the holding capacitor 222 of the (n+2)-th column. As described above, the signal switching circuit including the switches 191 and 193, the switch 221 in the n-th column, the switch 221 in the (n+1)-th column, and the switch 221 in the (n+2)-th column has a function of outputting a signal of each column to the next column according to the control signals sw and swb.

The method of driving the photoelectric conversion device of the present embodiment is the same as that illustrated in FIG. 3. That is, at the time of the offset clamping operation of time #12, the switches 191 and 193 are on, and the switch 221 is off. Thus, the input potential of the comparator 232 at the time of the offset clamping operation of time t12 and the input potential of the comparator 232 at the time of the AD conversion of time t16 are different from each other. Therefore, as in the first embodiment, the levels of the output signals of the plurality of comparators 232 hardly change all at once within a short time, and noise generated when the levels of the output signals of the comparators 232 of respective columns change can be reduced.

In this way, the same effect as in the first embodiment can be obtained also in the present embodiment. Therefore, according to the present embodiment, a photoelectric conversion device capable of outputting signals of higher quality is provided.

The signal switching circuit is not limited to one in which signals are switched between two columns as in the first embodiment, but may be one in which signals are switched between three or more columns as in the second embodiment. Further, switches included in the signal switching circuit may be provided between signal lines of respective columns. In this case, some or all of the signals in all columns of the pixel array 10 can be switched. Further, a combination of columns to be switched may be changed each time each row of the pixel array 10 is read. In this case, since the variation of the timings at which the levels of the output signals of the comparators 232 change is two-dimensionally irregular, the influence on the image quality due to the variation can be made less conspicuous.

Third Embodiment

The photoelectric conversion device according to the present embodiment will be described. Components similar to those in the first embodiment are denoted by the same reference numerals, and descriptions of these components may be omitted or simplified.

Figure 6:
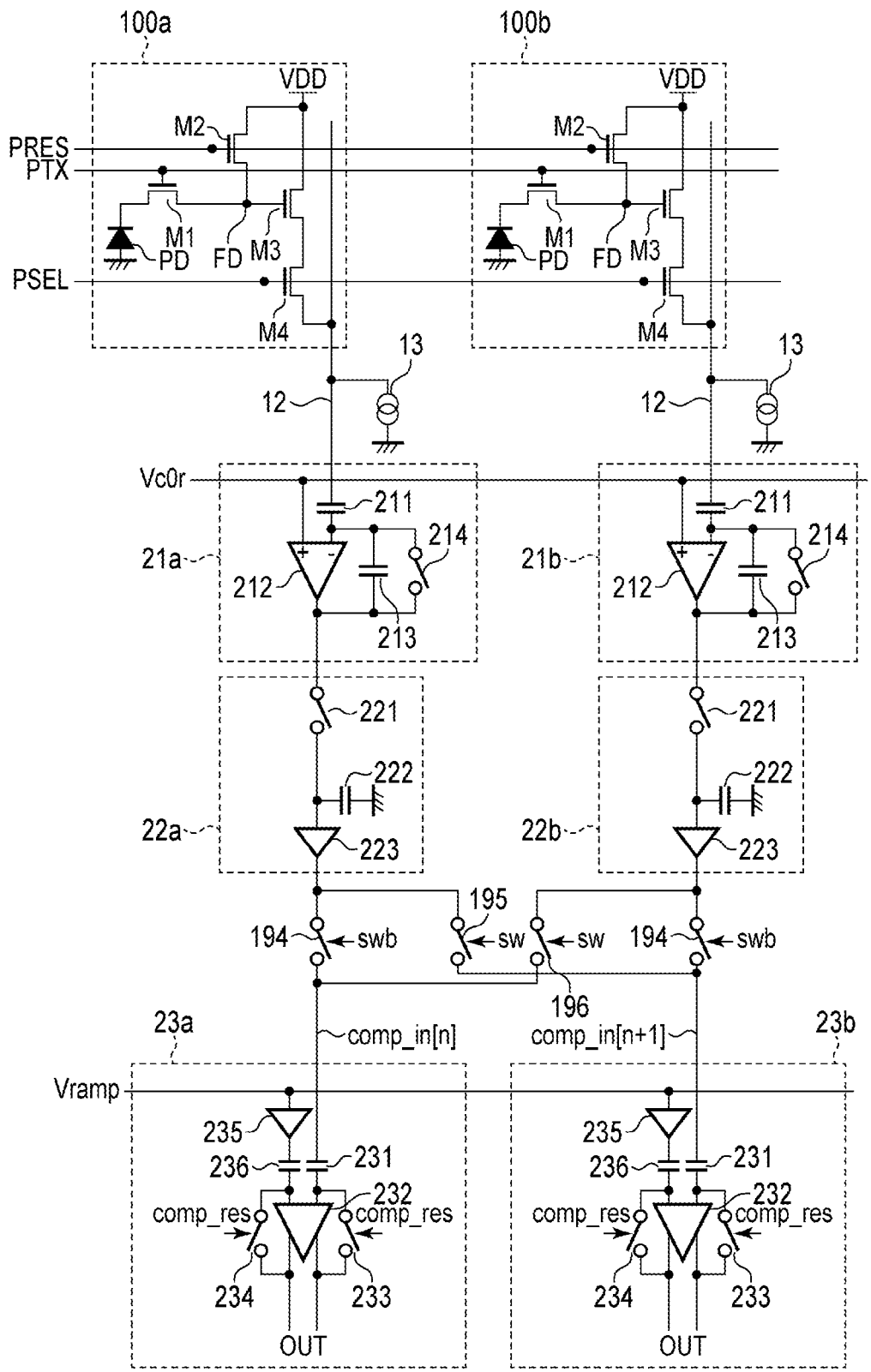
FIG. 6 is a circuit diagram illustrating a configuration of a pixel and a column circuit according to a third embodiment.

FIG. 6 is a circuit diagram illustrating a configuration of the pixel 100 and the column circuit 20 according to the present embodiment. In the photoelectric conversion device of the present embodiment, switches 194, 195, and 196 are arranged instead of the switches 191 and 192 in FIG. 2.

The output terminal of the amplifier 223 is connected to a first terminal of the switch 194. A second terminal of the switch 194 is connected to the first terminal of the input capacitor 231. A first terminal of the switch 195 is connected to anode to which the output terminal of the amplifier 223 of the n-th column and the first terminal of the switch 194 of the n-th column are connected. A second terminal of the switch 195 is connected to a node to which the second terminal of the switch 194 in the (n+1)-th column and the first terminal of the input capacitor 231 in the (n+1)-th column are connected. A first terminal of the switch 196 is connected to a node to which the output terminal of the amplifier 223 of the (n+1)-th column and the first terminal of the switch 194 of the (n+1)-th column are connected. A second terminal of the switch 196 is connected to a node to which the second terminal of the switch 194 in the n-th column and the first terminal of the input capacitor 231 in the n-th column are connected.

The switches 195 and 196 are controlled by the control signal sw from the timing generator 15 to be turned on or off. The switch 194 is controlled by the control signal swb from the timing generator 15 to be turned on or off. The control signal swb is a signal having a potential at the opposite level of the control signal sw.

When the control signal sw is at the low level and the control signal swb is at the high level, the switch 194 is turned on, and the switches 195 and 196 are turned off. At this time, the signal output from the analog signal holding unit 22a of the n-th column is input to the AD conversion unit 23a of the n-th column, and the signal output from the analog signal holding unit 22b of the (n+1)-th column is input to the AD conversion unit 23b of the (n+1)-th column.

When the control signal sw is at the high level and the control signal swb is at the low level, the switch 194 is turned of and the switches 195 and 196 are turned on. At this time, the signal output from the analog signal holding unit 22a of the n-th column is input to the AD conversion unit 23b of the (n+1)-th column, and the signal output from the analog signal holding unit 22b of the (n+1)-th column is input to the AD conversion unit 23a of the n-th column. Other circuit configurations are the same as those in FIG. 2, and thus description thereof is omitted.

As described above, in the present embodiment, the signal switching circuit including the switches 195 and 196, the switch 194 in the n-th column, and the switch 194 in the (n+1)-th column is arranged between the analog signal holding unit 22 and the AD conversion unit 23. The signal switching circuit has a function of swapping the signal in the n-th column and the signal in the (n+1)-th column with each other in accordance with the control signals sw and swb.

The method of driving the photoelectric conversion device of the present embodiment is the same as that illustrated in FIG. 3. That is, at the time of the offset clamping operation of the time t12, the switches 195 and 196 are on and the switch 194 is off. Thus, the input potential of the comparator 232 at the time of the offset clamping operation at the time t12 and the input potential of the comparator 232 at the time of the AD conversion at the time t16 are different from each other. That is, the potential al the time of the AD conversion of the input signal comp_in[n] is greater than that at the time of the offset clamping operation by ΔV. The potential at the time of the AD conversion of the input signal comp_in[n+1] is less than that at the time of the offset clamping operation by ΔV. Therefore, as in the first embodiment, the levels of the output signals of the plurality of comparators 232 hardly change all at once within a short time, and noise generated when the levels of the output signals of the comparators 232 of respective columns change can be reduced.

In this way, the same effect as in the first embodiment can be obtained also in the present embodiment. Therefore, according to the present embodiment, a photoelectric conversion device capable of outputting signals of higher quality is provided.

Fourth Embodiment

Figure 7:
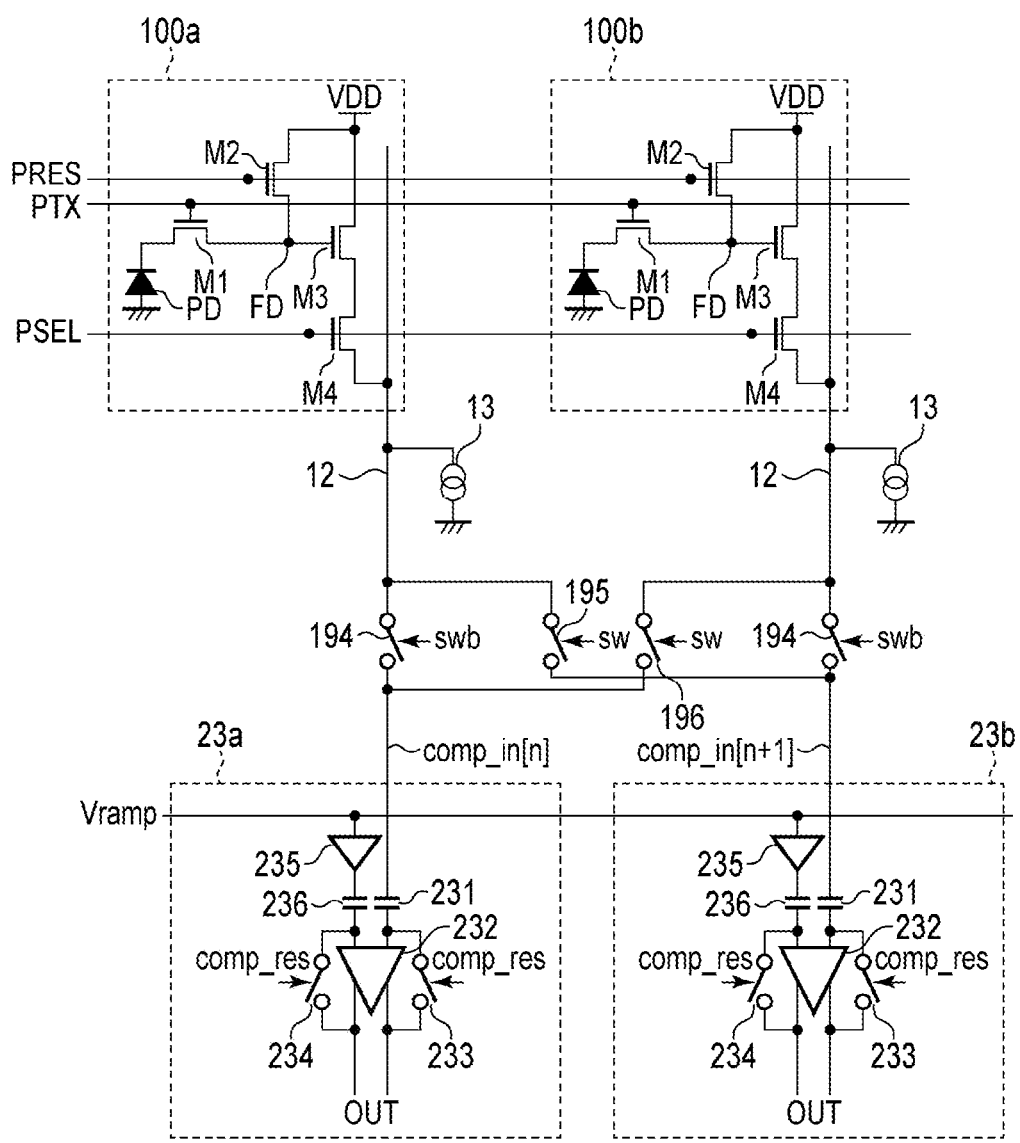
FIG. 7 is a circuit diagram illustrating a configuration of a pixel and a column circuit according to a fourth embodiment.

The photoelectric conversion device according to the present embodiment will be described. Components similar to those in the third embodiment are denoted by the same reference numerals, and descriptions of these components may be omitted or FIG. 7 is a circuit diagram illustrating a configuration of the pixel 100 and the column circuit 20 according to the present embodiment. In the photoelectric conversion device of the present embodiment, the amplification unit 21 and the analog signal holding unit 22 are omitted from the photoelectric conversion device of FIG. 6. The output line 12 in the n-th column is connected to the first terminal of the switch 194 in the n-th column and the first terminal of the switch 195, and the output line 12 in the (n+1)-th column is connected to the first terminal of the switch 194 in the (n+1)-th column and the first terminal of the switch 196. Other circuit configurations are the same as those in FIG. 6, and thus description thereof is omitted.

Even in the configuration in which the amplification unit 21 and the analog signal holding unit 22 are omitted as in the present embodiment, noise generated when the levels of the output signals of the comparators 232 of respective columns change can be reduced as in the third embodiment. Therefore, according to the present embodiment, a photoelectric conversion device capable of outputting signals of higher quality is provided.

Fifth Embodiment

The photoelectric conversion device according to the present embodiment will be described. Components similar to those in the first embodiment are denoted by the same reference numerals, and descriptions of these components may be omitted or simplified.

Figure 8:
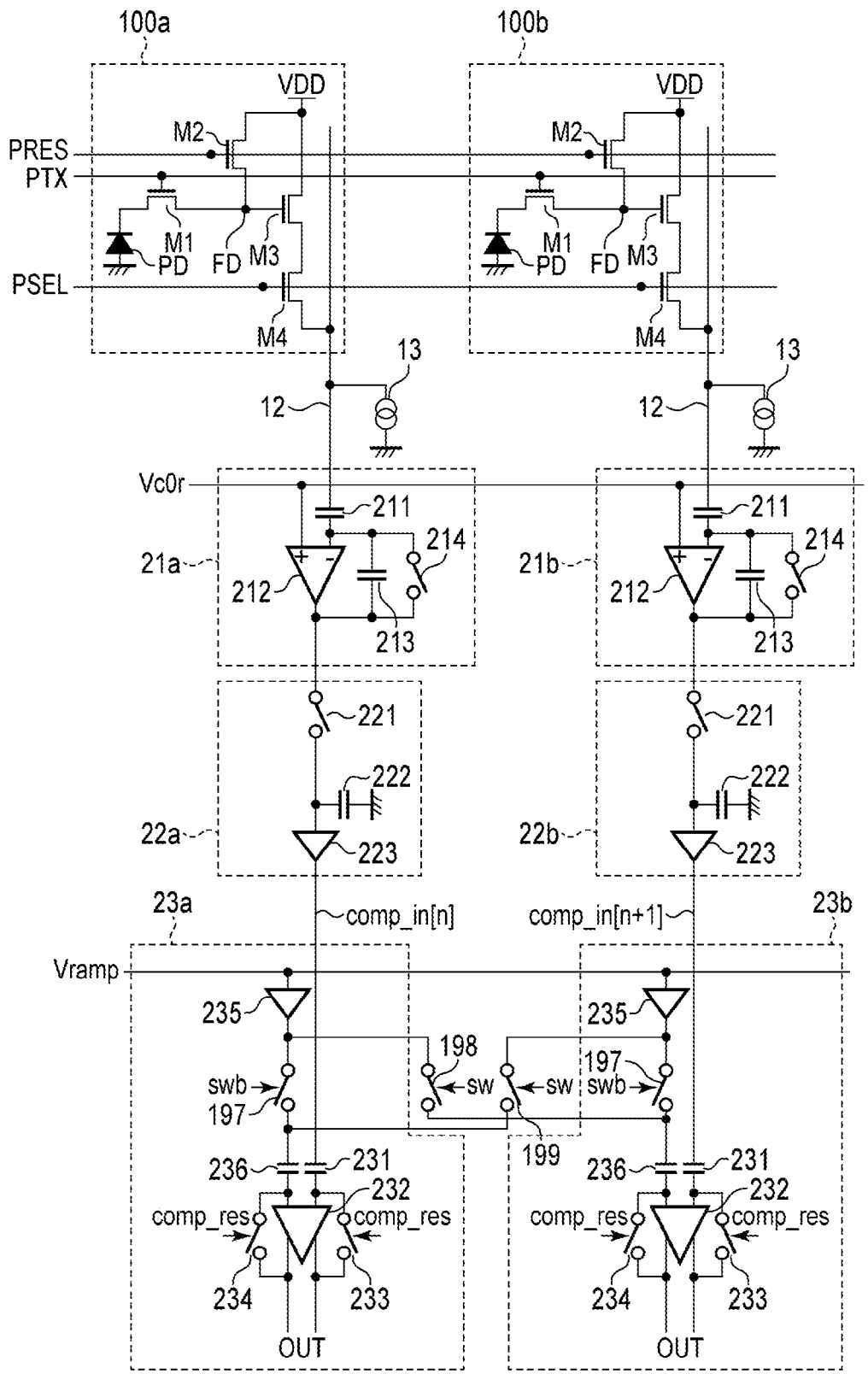
FIG. 8 is a circuit diagram illustrating a configuration of a pixel and a column circuit according to a fifth embodiment.

FIG. 8 is a circuit diagram illustrating a configuration of the pixel 100 and the column circuit 20 according to the present embodiment. In the photoelectric conversion device of the present embodiment, switches 197, 198, and 199 are arranged instead of the switches 191 and 192 in FIG. 2.

The output terminal of the amplifier 235 is connected to a first terminal of the switch 197. A second terminal of the switch 197 is connected to the first terminal of the input capacitor 236. A first terminal of the switch 198 is connected to a node to which the output terminal of the amplifier 235 of the n-th column and the first terminal of the switch 197 of the n-th column are connected. A second terminal of the switch 198 is connected to a node to which the second terminal of the switch 197 in the (n+1)-th column and the first terminal of the input capacitor 236 in the (n+1)-th column are connected. A first terminal of the switch 199 is connected to a node to which the output terminal of the amplifier 235 of the (n+1)-th column and the first terminal of the switch 197 of the (n+1)-th column are connected. A second terminal of the switch 199 is connected to a node to which the second terminal of the switch 197 in the n-th column and the first terminal of the input capacitor 236 in the n-th column are connected.

The switches 198 and 199 are controlled by the control signal sw from the timing generator 15 to be turned on or off. The switch 197 is controlled by the control signal swb from the timing generator 15 to be turned on or off. The control signal swb is a signal having a potential at the opposite level of the control signal sw.

When the control signal sw is at the low level and the control signal swb is at the high level, the switch 197 is turned on, and the switches 198 and 199 are turned off. At this time, a signal output from the amplifier 235 of the n-th column is input to the input capacitor 236 of the n-th column, and a signal output from the amplifier 235 of the (n+1)-th column is input to the input capacitor 236 of the (n+1)-th column.

When the control signal sw is at the high level and the control signal swb is at the low level, the switch 197 is turned off, and the switches 198 and 199 are turned on. At this time, a signal output from the amplifier 235 of the n-th column is input to the input capacitor 236 of the (n+1)-th column, and a signal output from the amplifier 235 of the (n+1)-th column is input to the input capacitor 236 of the n-th column. Other circuit configurations are the same as those in FIG. 2, and thus description thereof is omitted. In addition, the driving method of the photoelectric conversion device is the same as that in FIG. 3, and thus description thereof is omitted.

Effects of the present embodiment will be described. The reference signal Vramp is input to the amplifiers 235 via a reference signal line common to each column. However, the output node of the amplifier 235 in the n-th column and the output node of the amplifier 235 in the (n+1)-th column may have potentials different from each other due to a variation in performances of the amplifiers 235 in respective columns, a variation in wiring resistance, and the like. In the offset clamping operation at the time t12 in FIG. 3, the signal output from the amplifier 235 of the n-th column is input to the input capacitor 236 of the (n+1)-th column, and the signal output from the amplifier 235 of the (n+1)-th column is input to the input capacitor 236 of the n-th column. Thus, the potential based on the signal from the amplifier 235 in the (n+1)-th column is clamped to the input capacitor 236 in the n-th column, and the potential based on the signal from the amplifier 235 in the n-th column is clamped to the input capacitor 236 in the (n+1)-th column. On the other hand, during the period after the time t13, the signal output from the amplifier 235 of the n-th column is input to the input capacitor 236 of the n-th column, and the signal output from the amplifier 235 of the (n+1)-th column is input to the input capacitor 236 of the (n+1)-th column. At this time, since the signals at the clamping are swapped, the output node of the amplifier 235 in the n-th column and the output node of the amplifier 235 in the (n+1)-th column have potentials different from each other due to the variation. Thereby, the potentials of the reference signals input to the comparator 232 of the n-th column and the comparator 232 of the (n+1)-th column are different from each other at the time of the AD conversion of the time t16. Therefore, the levels of the output signals of the plurality of comparators 232 hardly change at the same time, and noise generated when the levels of the output signals of the comparators 232 of respective columns change can be reduced.

As described above, according to the present embodiment, a photoelectric conversion device capable of outputting signals of higher quality is provided.

In the above description, it is assumed that the amounts of change per unit time in the potentials of the reference signals of the n-th column and the (n+1)-th column are the same in the period during which the AD conversion is performed, but the present embodiment is not limited thereto. The amount of change per unit time of the potential of the reference signal of the n-th column may be different from the amount of change per unit time of the potential of the reference signal of the (n+1)-th column.

Sixth Embodiment

The photoelectric conversion device of the above-described embodiments can be applied to various equipment. Examples of the equipment include a digital still camera, a digital camcorder, a camera head, a copying machine, a facsimile, a mobile phone, a vehicle-mounted camera, an observation satellite, and a surveillance camera. FIG. 9 is a block diagram of a digital still camera as an example of equipment.

The equipment 70 illustrated in FIG. 9 includes a barrier 706, a lens 702, an aperture 704, and an imaging device 700 (an example of the photoelectric conversion device). The equipment 70 further includes a signal processing unit (processing device) 708, a timing generation unit 720, a general control/operation unit 718 (control device), a memory unit 710 (storage device), a storage medium control I/F unit 716, a storage medium 714, and an external I/F unit 712. At least one of the barrier 706, the lens 702, and the aperture 704 is an optical device corresponding to the equipment. The barrier 706 protects the lens 702, and the lens 702 forms an optical image of an object on the imaging device 700. The aperture 704 varies the amount of light passing through the lens 702. The imaging device 700 is configured as in the above-described embodiments, and converts an optical image formed by the lens 702 into image data (image signal). The signal processing unit 708 performs various corrections, data compression, and the like on the imaging data output from the imaging device 700. The timing generation unit 720 outputs various timing signals to the imaging device 700 and the signal processing unit 708. The general control/operation unit 718 controls the entire digital still camera, and the memory unit 710 temporarily stores image data. The storage medium control OF unit 716 is an interface for storing or reading image data on the storage medium 714, and the storage medium 714 is a detachable storage medium such as a semiconductor memory for storing or reading captured image data. The external I/F unit 712 is an interface for communicating with an external computer or the like. The timing signal or the like may be input from the outside of the equipment. The equipment 70 may further include a display device (a monitor, an electronic view finder, or the like) for displaying information obtained by the photoelectric conversion device. The equipment includes at least a photoelectric conversion device. Further, the equipment 70 includes at least one of an optical device, a control device, a processing device, a display device, a storage device, and a mechanical device that operates based on information obtained by the photoelectric conversion device. The mechanical device is a movable portion (for example, a robot arm) that receives a signal from the photoelectric conversion device for operation.

Each pixel may include a plurality of photoelectric conversion units (a first photoelectric conversion unit and a second photoelectric conversion unit). The signal processing unit 708 may be configured to process a pixel signal based on charges generated in the first photoelectric conversion unit and a pixel signal based on charges generated in the second photoelectric conversion unit, and acquire distance information from the imaging device 700 to an object.

Seventh Embodiment

Figure 10A:
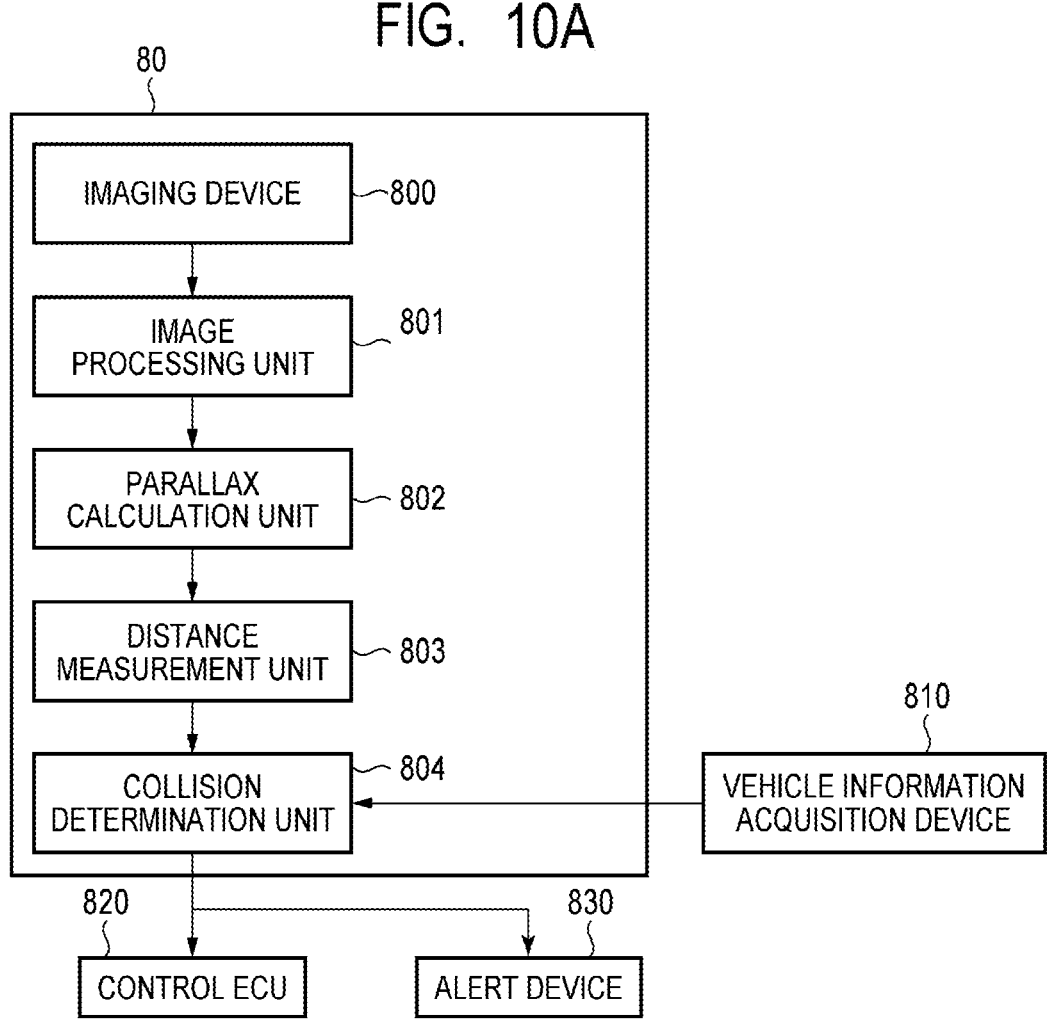
FIGS. 10A and 10B are block diagrams of equipment according to a seventh embodiment.
Figure 10B:
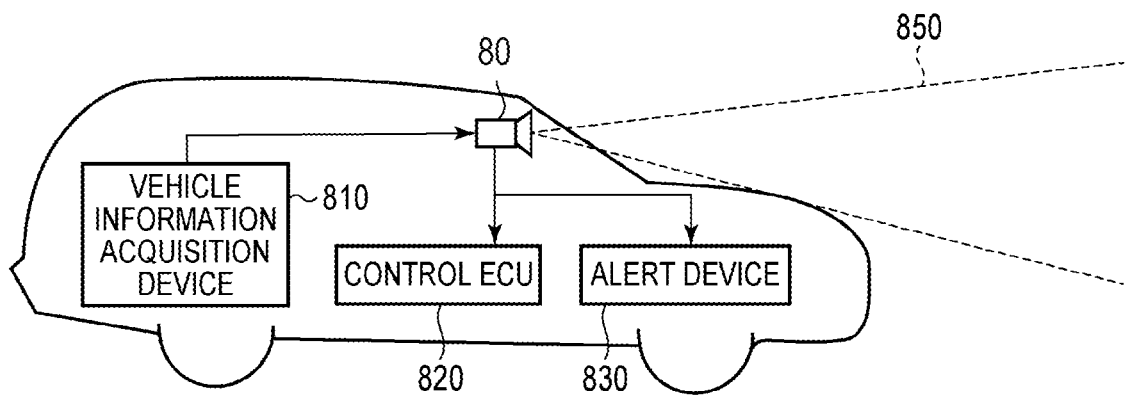

FIGS. 10A and 10B are block diagrams of equipment relating to the vehicle-mounted camera according to the present embodiment. The equipment 80 includes an imaging device 800 (an example of the photoelectric conversion device) of the above-described embodiments and a signal processing device (processing device) that processes a signal front the imaging device 800. The equipment 80 includes an image processing unit 801 that performs image processing on a plurality of pieces of image data acquired by the imaging device 800, and a parallax calculation unit 802 that calculates parallax (phase difference of parallax images) from the plurality of pieces of image data acquired by the equipment 80. The equipment 80 includes a distance measurement unit 803 that calculates a distance to an object based on the calculated parallax, and a collision determination unit 804 that determines whether or not there is a possibility of collision based on the calculated distance. Here, the parallax calculation unit 802 and the distance measurement unit 803 are examples of a distance information acquisition unit that acquires distance information to the object. That is, the distance information is information on a parallax, a defocus amount, a distance to the object, and the like. The collision determination unit 804 may determine the possibility of collision using any of these pieces of distance information. The distance information acquisition unit may be realized by dedicatedly designed hardware or software modules. Further, it may be realized by a field programmable gate array (FPGA), an application specific integrated circuit (ASIC) or a combination thereof.

The equipment 80 is connected to a vehicle information acquisition device 810, and can acquire vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm such as a sound, displaying alert information on a screen of a car navigation system or the like, or giving vibration to a seat belt or a steering wheel. The equipment 80 functions as a control unit that controls the operation of controlling the vehicle as described above.

In the present embodiment, an image of the periphery of the vehicle, for example, the front or the rear is captured by the equipment 80. FIG. 10B illustrates equipment in a case where an image is captured in front of the vehicle (image capturing range 850). The vehicle information acquisition device 810 as an imaging control unit sends an instruction to the equipment 80 or the imaging device 800 to perform the imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above-described embodiments, and various modifications are possible. For example, an example in which some of the configurations of any of the embodiments are added to other embodiments or an example in which some of the configurations of any of the embodiments are replaced with some of the configurations of other embodiments is also an embodiment of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198342, filed Dec. 7, 2021, which is hereby incorporated by reference herein in its entirety.

What is claimed is:

1. A photoelectric conversion device comprising:
a plurality of pixels arranged to form a plurality of columns;
an output line arranged corresponding to each of the plurality of columns, a signal from a corresponding pixel being output to the output line;
a comparison unit arranged corresponding to each of the plurality of columns and having a first input terminal and a second input terminal, a signal corresponding to a potential of the output line being input to the first input terminal, a reference signal being input to the second input terminal; and
a signal switching circuit,
wherein the plurality of pixels includes a first pixel and a second pixel,
wherein the comparison unit is configured to perform an offset clamping operation of setting an offset based on potentials input to the first input terminal and the second input terminal,
wherein the comparison unit performs the offset clamping operation based on a signal level of a signal output from the first pixel, and then performs comparison for analog-to-digital conversion of a signal output from the second pixel,
wherein the plurality of columns includes a first column and a second column,
wherein the first pixel is arranged in the first column,
wherein the second pixel is arranged in the second column, and
wherein the signal switching circuit can switch between a first state in which a signal output from the first pixel is input to a comparison unit of the second column and a second state in which a signal output from the second pixel is input to the comparison unit of the second column.

2. The photoelectric conversion device according to claim 1,
wherein in the first state, a signal output from the second pixel is input to a comparison unit of the first column, and
wherein in the second state, a signal output from the first pixel is input to the comparison unit of the first column.

3. The photoelectric conversion device according to claim 1,
wherein the plurality of columns further includes a third column, and
wherein in the first state, a signal output from the second pixel is input to a comparison unit of the third column.

4. The photoelectric conversion device according to claim 1 further comprising a holding capacitor arranged corresponding to each of the plurality of columns and configured to hold a signal output from a corresponding pixel,
wherein the signal switching circuit is connected to the holding capacitor.

5. The photoelectric conversion device according to claim 1 further comprising a first input capacitor arranged corresponding to each of the plurality of columns, wherein a signal corresponding to an output of a corresponding pixel is input to the first input terminal via the first input capacitor, and wherein the signal switching circuit is connected to the first input capacitor.

6. The photoelectric conversion device according to claim 5 further comprising:

a holding capacitor arranged corresponding to each of the plurality of columns and configured to hold a signal output from the pixel; and a first buffer arranged corresponding to each of the plurality of columns and arranged between the holding capacitor and the first input capacitor, wherein the signal switching circuit is arranged between the first buffer and the first input capacitor.

7. The photoelectric conversion device according to claim 1, wherein the plurality of pixels is arranged to form a plurality of rows and the plurality of columns, and wherein the first pixel and the second pixel are arranged in different rows in the same column among the plurality of columns.

8. The photoelectric conversion device according to claim 1, wherein an operation of the signal switching circuit varies depending on a gain setting of an amplification unit configured to amplify a signal output to the output line.

9. The photoelectric conversion device according to claim 1, wherein an operation of the signal switching circuit varies depending on an amount of change per unit time of a potential of the reference signal.

10. The photoelectric conversion device according to claim 1, wherein an operation of the signal switching circuit varies depending on temperature of the photoelectric conversion device.

11. The photoelectric conversion device according to claim 1, wherein during a period before the offset clamping operation starts, the signal switching circuit enters the first state.

12. The photoelectric conversion device according to claim 1, wherein after the offset clamping operation is performed, the signal switching circuit enters the second state.

13. The photoelectric conversion device according to claim 12, wherein after the signal switching circuit enters the second state, a potential of the reference signal starts to change depending on time.

14. Equipment comprising:

the photoelectric conversion device according to claim 1; and at least any one of:

an optical device adapted for the photoelectric conversion device, a control device configured to control the photoelectric conversion device, a processing device configured to process a signal output from the photoelectric conversion device, a display device configured to display information obtained by the photoelectric conversion device, a storage device configured to store information obtained by the photoelectric conversion device, and a mechanical device configured to operate based on information obtained by the photoelectric conversion device.

15. The equipment according to claim 14, wherein the processing device processes image signals generated by a plurality of photoelectric conversion units, respectively, and acquires distance information on a distance from the photoelectric conversion device to an object.

* * * * *